United States Patent Office 3,023,212
Patented Feb. 27, 1962

3,023,212
BASIC DYES OF THE QUINOPHTHALONE SERIES
John William Richter, Wilmington, Del., assignor to E. I. du Pont de Nemours and Company, Wilmington, Del., a corporation of Delaware
No Drawing. Filed June 30, 1960, Ser. No. 39,756
7 Claims. (Cl. 260—286)

This invention relates to novel organic compounds which are useful as dyes for a wide variety of synthetic fibers, including in particular acid-modified polyester and acrylic fibers.

The acid-modified polyester fibers referred to in this specification are linear polyester fibers containing metal sulfonate groups, as described more fully in British Patent No. 826,248, accepted December 31, 1959.

The acid-modified acrylic fibers are sulfonate-modified acrylic fibers, such as those described in U.S. Patent Nos. 2,837,500 and 2,837,501.

It is an object of this invention to provide novel compounds which can be used as basic dyes for acid-modified polyester and acrylic fibers, producing thereon bright, strong, greenish-yellow shades of outstanding fastness properties, particularly to light, washing and sublimation. Other objects and achievements of this invention will appear as the description proceeds.

Now, I have found that these objects are achieved by a novel series of compounds which may be termed broadly side-chain, nitrogenous, amide and ester derivatives of 3-hydroxyquinophthalone-5-carboxylic acid and its Bz-substitution derivatives. More particularly, the novel compounds of this invention are members of a group consisting of the free base form, salts and quaternary ammonium derivatives of quinophthalone compounds which in free base form fall within the general formula

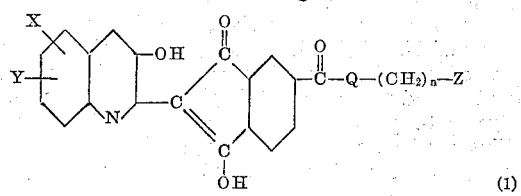
(1)

In this formula X represents H, Cl, Br, $CH_3$ or $C_6H_5$ (phenyl), Y represents H, Cl, Br or $CH_3$, or X and Y jointly represent the benzo configuration

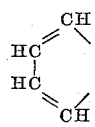

Q is a link selected from the group consisting of O, NH and N-alkyl; n is an integer from 2 to 4; and the member Z represents an amine radical of the group consisting of dialkyl-amine, monoalkyl monohydroxyalkyl-amine, dihydroxyalkyl-amine, monoalkyl monobenzyl-amine, monohydroxyalkyl monobenzyl-amine, morpholine, piperidine and pyrrolidine; all alkyls hereinabove mentioned being radicals of 1 to 4 C-atoms.

Moreover, I find that the basic form of the above novel series of compounds are applicable also as disperse dyes on hydrophobic fibers, such as nylon and cellulose triacetate, where heat-stable and hydrolytic-stable dyes having good light fastness are needed.

The novel compounds of this invention are prepared by condensing a 3'-hydroxyquinophthalone-5-carbonyl halide (Cl or Br; see Example 7 of my copending application of even date herewith, Serial No. 39,755), in the same reaction mass in which it is formed or after isolation, with a hydroxy or amino aliphatic tertiary base compound of the formula

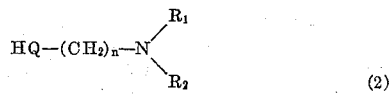
(2)

wherein Q, n, $R_1$ and $R_2$ have the same meaning as above. Bringing the two reactants together in an inert solvent at, initially, room temperature suffices to bring about reaction, the latter being exothermic, and the tertiary N-atom of the added reagent serving to absorb the hydrogen halide eliminated in the reaction. The solvent may be strictly inert, such as nitrobenzene or dichlorobenzene, or it may be relatively inert; for instance, it may be a lower alcohol whose reactivity with the carbonyl halide would be very slow compared to the more rapidly acting basic reagent of the above Formula 2.

The reaction product is generally isolated in the form of a salt, such as the hydrochloride, which may then be converted into the free base by treatment with alkali, and the latter may optionally be converted into other salts, for instance, sulfate, phosphate or acetate, or it may be converted into a quaternary compound by reacting the same, in known manner, with a quaternizing agent, such as dimethyl sulfate, diethyl sulfate, methyl bromide, methyl-p-toluene sulfonate, etc.

Without limiting this invention, the following examples are given to illustrate my preferred mode of operation. Parts mentioned are by weight.

EXAMPLE 1

To a slurry of 13 parts of 3'-hydroxyquinophthalone-5-carboxylic acid (obtained as in Example 1 of my copending application, Serial No. 39,757) in 96 parts of dry nitrobenzene, are added 5.8 parts of thionyl chloride. The mixture is heated at 90° to 95° C. for 2 hours. Dry nitrogen gas is blown into the reaction mass at 90° C. for 0.5 hour to remove hydrogen chloride and excess thionyl chloride. After cooling to 30° C., 10 parts of N,N-dimethyl-1,3-propanediamine is added dropwise causing the temperature to rise to 50° C. The mixture is stirred at 50° C. for 3 hours, cooled in an ice bath and diluted with 70 parts of isopropanol. The product is collected on a filter and washed with isopropanol. The dye obtained, represented by the formula

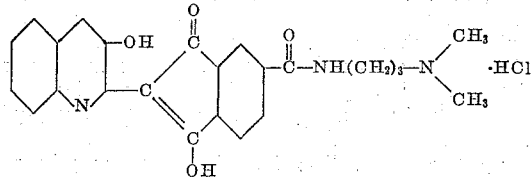

dyes acid-modified acrylic and polyester fibers from a hot weakly acidic aqueous dyebath (see Example 9) in strong yellow shades having excellent fastness properties.

The free base of the dye hydrochloride is obtained by treating an aqueous solution of the dye salt with sodium hydroxide and filtering off the dye base from the alkaline medium, and may be named N-(3-dimethylaminopropyl)-3'-hydroxyquinophthalone-5-carboxamide.

Other salts of the tertiary amine dye can be prepared in the following manner. One part of the dye hydrochloride is slurried in 10 parts of isopropanol, and the slurry is made basic by adding 0.2 part of 10 N sodium hydroxide. The trichloroacetate salt is precipitated by adding 0.8 part of trichloroacetic acid and is filtered off and dried. The acetic acid, sulfamic acid and oxalic acid salts are obtained in like manner.

EXAMPLE 2

To a slurry of 7 parts of 3'-hydroxyquinophthalone-5-carbonyl chloride (Example 7 of my copending application Serial No. 39,755) in 21 parts of 2-ethoxyethanol are added 2.2 parts of N,N - dimethyl-1,3-propanediamine. After stirring at 60° to 65° C. for 1 hour, 42 parts of isopropanol are added. The mixture is agitated at 80° to 82° C. for 1.5 hours. After cooling to room temperature, a few drops of concentrated hydrochloric acid are added to give an acidic reaction to Congo red paper. The hydrochloride of the yellow dye is filtered off in excellent yield and washed with a little ethanol. The product dyes acid-modified acrylic and polyester fibers from a hot aqueous dyebath in bright, greenish-yellow shades having excellent light fastness.

In lieu of N,N-dimethyl-1,3-propanediamine used in Example 2, any of the following amines may be used to afford yellow dyes having similar properties to the dye disclosed above.

N,N-dimethylethylenediamine,
N,N-diethyl-1,4-butadediamine,
N,N-dibutylethylenediamine,
N,N,N'-trimethyl-1,3-propanediamine,
2,2'-(4-aminobutylimino)diethanol,
2-[(3-aminopropyl)methylamino]ethanol,
3-[(3-aminopropyl)ethylamino]-1-propanol,
1-[(2-aminoethyl)methylamino]-2-propanol,
1-butylamino-3-dimethylamino-2-propanol,
4-(3-aminopropyl)morpholine,
1-(3-methylaminopropyl)piperidine,
1-amino-3-(1-pyrrolidino)-2-propanol.

The hydrochloride of any of the yellow dyes named in Example 2 may be converted to its free base form by adding an alkali, e.g. sodium hydroxide to an aqueous slurry of the dye salt. The dye is collected on a filter in free base form, and washed with water.

In general, the diamino intermediates used in this application are commercially available products, or may be made according to well known methods, say, by reacting 1 mole of an alkylene dibromide with 1 mole of a secondary amine followed with an excess of ammonia or a primary alkyl amine.

EXAMPLE 3

A mixture of 5 parts of N-(3-dimethylaminopropyl)-3' - hydroxyquinophthalone-5-carboxamide (Example 1 above), 3 parts of dimethyl sulfate and 20 parts of isopropanol is heated at 80° C. for 5 hours. After cooling to room temperature, the yellow dye is collected on a filter and washed with isopropanol. This product dyes acid-modified acrylic and polyester fibers in greenish-yellow shades having excellent fastness properties.

In lieu of N-(3-dimethylaminopropyl)-3'-hydroxyquinopthalone-5-carboxamide, any of the free bases of the other yellow dyes indicated in Example 2 may be converted to the quaternary ammonium salt by condensation with dimethyl sulfate. In lieu of dimethyl sulfate, other reagents capable of yielding quaternary ammonium salts, such as diethyl sulfate, dipropyl sulfate, dibutyl sulfate, benzyl chloride, methyl-p-toluenesulfonate, short chain alkyl chlorides, bromides or iodides such as butyl chloride, propyl bromide and methyl iodide, may be used under known conditions to prepare other quaternary ammonium dyes.

EXAMPLE 4

A mixture of 35 parts of 3'-hydroxyquinophthalone-5-carbonyl chloride (Example 7 of my copending application Serial No. 39,755), 10 parts of 2-dimethylaminoethanol and 150 parts of o-dichlorobenzene is heated at 100° C. for ten hours. After cooling to 10° C., 100 parts of cyclohexane are added. The yellow dye is collected on a filter. The crude dye is dissolved in one liter of boiling, 0.2 molar, aqueous acetic acid and filtered hot. After cooling to room temperature, the aqueous filtrate is made basic with 100 parts of 3 N aqueous sodium hydroxide. The yellow dye is collected on a filter and then dried. It has the structure

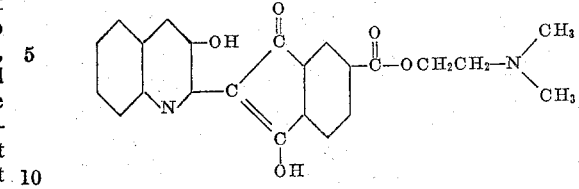

and may be named 2 - dimethylaminoethyl 3'-hydroxyquinophthalone-5-carboxylate. This product dyes acid-modified acrylic and polyester fibers, using the procedure of Example 9 below, in bright, greenish-yellow shades having excellent light fastness.

The above dye is converted to its acid salts as follows: One part of the dye formulated above is slurried in 6 parts of isopropanol, and a sufficient amount of a 10% aqueous solution of sulfamic acid is added to make the medium acid to Congo red. The dye sulfamate salt is filtered off and dried. Other acid salts of the dye are made in like manner by replacing the sulfamic acid by any of the following acids: acetic, trichloroacetic, hydrochloric, sulfuric, nitric or oxalic.

Other basic yellow dyes having similar properties may be prepared by this process. Thus, in lieu of 2-dimethylaminoethanol an equivalent amount of the following alcohols may be used:

1-dimethylamino-2-propanol,
2-(benzylmethylamino)ethanol,
2-morpholinoethanol,
1-piperidino-2-propanol.

The above alkanol intermediates are readily available and may be made by condensing a secondary amine with the appropriate alkylene oxide.

EXAMPLE 5

A mixture of 5 parts of 2-dimethylaminoethyl-3'-hydroxyquinophthalone-5-carboxylate (from Example 4), 3 parts of dimethyl sulfate and 20 parts of isopropanol is heated at 80° C. for 5 hours. The mixture is cooled and diluted with 30 parts of acetone. The yellow cationic dye is collected on a filter and washed with acetone. This product, which is the methyl-methosulfate of the compound formulated in Example 4, dyes acid-modified acrylic and polyester fibers in deep yellow shades.

In lieu of 2-dimethylaminoethyl - 3' - hydroxyquinophthalone-5-carboxylate, any of the basic amino-esters indicated in Example 4 may be used. Other reagents capable of forming quaternary ammonium salts (for instance, any of those named in Example 3) may be used in place of dimethyl sulfate to afford yellow dyes having similar dyeing properties.

EXAMPLE 6

A mixture of 10 parts of 6',8'-dichloro-3'-hydroxyquinophthalone-5-carbonyl chloride (obtained by heating 6',8'-dichloro-3'-hydroxyquinophthalone-5-carboxylic acid with an equivalent amount of thionyl chloride at 90° C. in nitrobenzene; compare Example 7 of my copending application Serial No. 39,755) 3 parts of N,N-dimethyl-1,3-propanediamine, and 30 parts of 2-ethoxyethanol is stirred at 70° to 80° C. for 3 hours. The mixture is diluted with 40 parts of isopropanol and cooled to room temperature. A few drops of concentrated hydrochloric acid are added to the slurry to give an acidic reaction to Congo red paper. The yellow dye is collected on a filter and washed with isopropanol.

EXAMPLE 7

A mixture of 5 parts of 8'-methyl-3'-hydroxyquinophthalone-5-carbonyl chloride, 20 parts of 2-ethoxyethanol, and 2-parts of 1-amino-3-(4-morpholino)-2-propanol is stirred at 70° to 80° C. for a few hours. After cooling to 0° C., 30 parts of acetone and a few drops of concentrated hydrochloric acid are added. The yellow needles are collected on a funnel and washed with acetone. The product is soluble in hot water, from which it dyes acid-modified acrylic fibers in bright yellow shades. It has the structure

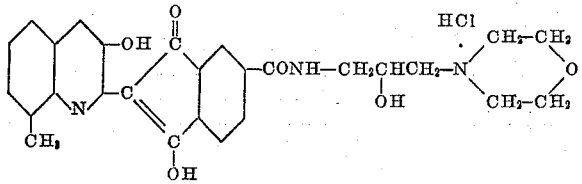

EXAMPLE 8

To a slurry of 5.5 parts of 6'-chloro-3'-hydroxyquinophthalone-5-carboxylic acid in 48 parts of nitrobenzene, is added 3.6 parts of thionyl chloride at room temperature. The mixture is heated at 95° C. for 3 hours, cooled to 0° C. and diluted with 50 parts of benzene. The acid chloride is collected on a filter and washed with benzene. The filter cake is added to a solution of 2 parts of 2-diethylaminoethanol in 35 parts of 2-butanone. The mixture is heated under reflux for 4 hours. After cooling to 5° C., a few drops of concentrated hydrochloric acid are added. The yellow crystals are collected on a filter and washed with a little acetone. This product dyes acid-modified acrylic and polyester fibers in deep, bright, yellow shades. It has the structure

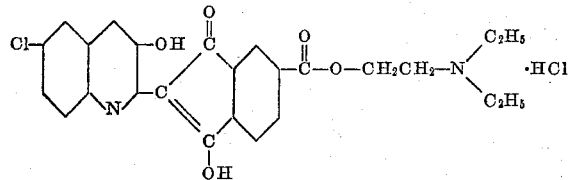

The initial quinophthalone compound employed in this example may be prepared as in Example 4 of my co-pending application of even date herewith, Serial No. 39,757, except starting with 6-chloro-3-hydroxy-2-methyl-4-quinolinecarboxylic acid in lieu of the 6,8-dichloro compound named there.

EXAMPLE 9

*Dyeing Procedure (Acid-Modified Acrylic Fiber)*

100 parts of acid-modified acrylic fiber are prescoured at 160° F. for 15 minutes in 4000 parts of water and 1 part of a non-ionic dispersing agent (for instance, the condensation product of oleyl alcohol with 20 moles of ethylene oxide). The fabric is rinsed and then boiled for 2 hours in a dyebath consisting of 1 part of glacial acetic acid, 1 part of the dye hydrochloride whose structure is given in Example 1, 0.3 part of sodium acetate and 4000 parts of water. The fabric is then rinsed in warm water and scoured as before. Finally, the fabric is rinsed, dried and pressed. A bright, light-fast yellow dyeing is obtained.

When the dye salts of Example 2 or the cationic dyes of Example 3 are used in this dyeing procedure, similar light-fast yellow dyeings are obtained.

EXAMPLE 10

*Dyeing Procedure (Acid-Modified Polyester Fiber)*

A dyebath is prepared by mixing:

| | Parts |
|---|---|
| The cationic dye of Example 5 | 1.0 |
| Glacial acetic acid | 1.0 |
| Non-ionic surfactant (e.g. the condensation product of 20 moles of ethylene oxide with one mole of oleyl alcohol) | 1.2 |
| Dimethylterephthalate | 0.8 |
| Benzanilide | 0.8 |
| Water to make a total of | 4000 |

100 parts of a fabric consisting of acid-modified polyester fiber are entered into the dyebath (having a pH about 5) and the bath temperature is raised to 212° F. and maintained for 2 hours. At the end of this time the cloth is removed, rinsed in water, and scoured for 15 minutes at 200° F. with 0.3 part of the sodium salt of the sulfate of the condensation product of ethylene oxide and oleyl alcohol (20 moles:1 mole) dissolved in 4000 parts of water. The fabric is then removed from the scour bath, rinsed in water, and dried. A light-fast yellow dyeing is obtained.

EXAMPLE 11

*Dyeing Procedure (Disperse Dyeing of Cellulose Triacetate)*

One part of the free base form of the dye produced in Example 1 is pasted in 2 parts of dimethyl formamide and added to a dyebath consisting of 0.4 part of the sodium salt of a commercial, long-chain alkyl sulfate and 4000 parts of water. Then 100 parts of a cellulose triacetate fabric are introduced and the mixture is boiled for 0.5 hour. After adding 20 parts of benzanilide the mixture is heated at the boil for 1.5 hours. The fabric is rinsed, scoured in 4000 parts of water containing 1 part of sodium carbonate and 2 parts of the sodium salt of the sulfate of the condensation product of ethylene oxide and oleyl alcohol (20 moles:1 mole) for 30 minutes at 180° F., rinsed again, and dried. The fabric is then suspended for 2 minutes in air heated at 450° F. The fabric is rinsed again in water at 180° F. and then dried. A light-fast yellow dyeing is obtained.

It will be understood that the details of the above examples may be varied widely within the skill of those engaged in this art.

I claim as my invention:

1. A compound selected from the group consisting of the free base forms, salts and quaternary forms of compounds whose free base form is defined by the formula

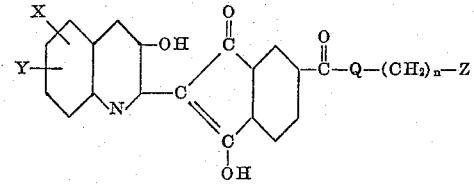

wherein X and Y represent members of the group consisting of H, Cl, Br, $CH_3$ and phenyl and when taken together form the benzo configuration

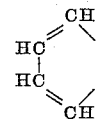

$n$ is an integer from 2 to 4, Q is a link selected from the group consisting of O, NH and N-alkyl, while Z represents an amine radical of the group consisting of dialkylamine, monoalkyl monohydroxyalkyl-amine, dihydroxyalkyl-amine, monoalkyl monobenzyl-amine, monohydroxyalkyl monobenzyl-amine, morpholine, piperidine and pyrrolidine, said quaternary forms being compounds formed by quaternizing said bases with compounds selected from the group consisting of lower alkyl sulfates, chlorides, bromides and iodides, benzyl chloride and methyl p-toluenesulfonate, all alkyls hereinabove mentioned being radicals of 1 to 4 C-atoms.

2. The compound of formula

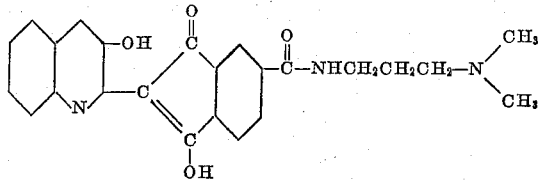

3. The hydrochloride of the compound defined in claim 2.
4. The ethyl-ethosulfate of the compound defined in claim 2.
5. The compound of formula
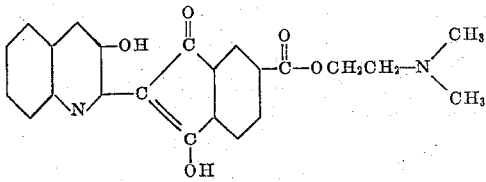
6. The hydrochloride of the compound defined in claim 5.
7. The methyl-methosulfate of the compound defined in claim 5.
References Cited in the file of this patent
UNITED STATES PATENTS
| | | |
|---|---|---|
| 2,592,370 | Zwilgmeyer | Apr. 8, 1952 |
| 2,795,582 | Bauer et al. | June 11, 1957 |
| 2,818,409 | Zwilgmeyer | Dec. 31, 1957 |
| 2,828,311 | Gifford | Mar. 25, 1958 |